United States Patent
Sanko et al.

[11] 3,894,692
[45] July 15, 1975

[54] PROCESS AND APPARATUS FOR THE PREPARATION OF ASBESTOS CEMENT SUSPENSION

[76] Inventors: Leonid Yakovlevich Sanko, ulitsa Fadeeva, 6, kv. 190; Eduard Alexeevich Valjukov, ulitsa, 34, korpus 1, kv. 58; Jury Semenovich Grizak, Dmitrovskoe shosse, 27, kv. 200; Alexandr Grigorievich Naumov, Khoroshevskoe shosse, 76, korpus 5, kv. 31, all of Moscow; Vasily Denisovich Lysenko, ulitsa Mira, 6, Tolyatti, all of U.S.S.R.

[22] Filed: May 23, 1974

[21] Appl. No.: 472,912

[52] U.S. Cl................. 241/4; 241/21; 241/30; 241/43; 241/46.15; 241/71; 241/176
[51] Int. Cl................................................. B02c 17/06
[58] Field of Search............. 241/43, 44, 45, 46.02, 241/46.15, 70, 71, 72, 171, 172, 176, 30

[56] References Cited
UNITED STATES PATENTS

| | | |
|---|---|---|
| 1,513,952 | 11/1924 | Apted ................................. 241/71 |
| 1,914,184 | 6/1933 | Traquair ........................ 241/171 X |
| 2,351,870 | 6/1944 | Newhouse ........................ 241/43 X |
| 3,404,846 | 10/1968 | MacPherson et al. ................ 241/72 |

*Primary Examiner*—Granville Y. Custer, Jr.
*Attorney, Agent, or Firm*—Holman & Stern

[57] ABSTRACT

A process for the preparation of an asbestos cement suspension and an apparatus for carrying out the process. In the process, cement clinker and gypsum are comminuted together in an aqueous medium. The apparatus includes a cylindrical housing rotatable on journals with the housing accommodating chambers, two of which are provided with apertured interchambers and outlet partition walls, respectively, thereby forming a drum ball mill. The mill adjoins one of the end walls of the housing connected to a feeder for supplying the starting materials. A third chamber is provided which is separated by the ball mill by a partition wall having a central opening and is located adjacent to the opposite end of the housing connected to a feeder supplying asbestos. The third chamber wet fluffs the asbestos.

3 Claims, 5 Drawing Figures

FIG.1

PROCESS AND APPARATUS FOR THE PREPARATION OF ASBESTOS CEMENT SUSPENSION

The present invention relates to a process for the preparation of asbestos cement suspensions for use in the manufacture of various asbestos cement articles, and also to an apparatus for carrying out this preparation process.

The invention may also be used in other industries where it is required to perform the comminution of materials of various hardness with subsequent mixing thereof.

It is widely known to prepare an asbestos cement suspension for use in the manufacture of asbestos cement articles by comminuting cement clinkers with gypsum, with wet fluffing of the asbestos with a subsequent mixing of the components in an aqueous medium.

Cement clinkers and gypsum are comminuted by the dry method at a cement plant, and the wet fluffing of asbestos is performed at an asbestos cement plant. The dry cement powder is transported to the asbestos cement plant to be mixed with the wet fluffed asbestos and water.

In order to prepare cement at cement plants, cement clinkers and gypsum are comminuted by using drum mills of various types adapted for the continuous dry comminution of materials. The drum mills are equipped with a suction system provided with filters for trapping cement dust formed during the dry milling.

The mills are provided with a continuous transportation system to feed finished comminuted cement from the cement mills into receptacles (silos) for storage. The cement is then transported from the silos by an appropriate transport facilities, such as pneumatic, automobile, or railway transport, to the asbestos cement plant.

Wet fluffing of asbestos is performed at the asbestos cement plant in two stages: first, asbestos fibers are compressed in runner mills with the addition of a small quantity of water so as to break the bonds therebetween, and then the asbestos is split into fine fibers in the aqueous medium so that the asbestos is fluffed. The next stop of preparing asbestos cement suspension consists in the addition of the cement powder to the aqueous suspension of the fluffed asbestos, and thorough mixing of the components in mixers of various types.

Thus, the preparation of asbestos cement suspension by known methods is associated with the employment of a number of power-consuming cumbersome machines and equipment for the preliminary treatment of the starting components prior to the mixing thereof.

Furthermore, the comminution of cement clinkers by the dry method results in excessive dust formation so that filters for trapping the cement dust are required, as well as with combersome and expensive silos being necessary for cement storage.

The transportation of the cement powder to the asbestos cement plants requires the installation of compressors, and pneumatic pumps (in the case of pneumatic transportation), or the employment of covered containers for transporting same by railway, or automobile.

The known apparatus and equipment for fluffing asbestos and for preparing asbestos cement suspensions operates intermittently, thereby hampering the provision of a continuous manufacturing process for making articles, such as pipes and sheets on pipe, or sheet moulding machines.

It is also widely known to use various multiple drum mills operating by either the wet or dry method, and which comprises a cylindrical casing rotating about a central axis, with the casing being divided by perforated partitions into chambers filled with milling bodies - balls and cylpebs - occupying 30–40% of the chamber space. Such mills are intended for the comminution of materials having similar hardnesses.

Attempts to employ such mills for concurrent comminution of the several components of the starting charge in a single mill were not a success because of different degrees of comminution of the components of the material being processed. Thus, for example, a material having a lower hardness is overcomminuted, whereas a harder material is undercomminuted. For that reason the combined comminution of cement clinkers, gypsum, and asbestos concurrently in one and the same mill is inacceptable, since asbestos will be overcomminuted such that its fibers will become shorter, with an ensuing loss in their reinforcing capacity.

It is therefore an object of the invention to provide a process for the preparation of asbestos cement suspensions, which permits a substantially simpler production method, and which may be carried out in a single apparatus located directly adjacent to the place of utilization of the suspension.

Another object of the invention is to provide an apparatus for the preparation of asbestos cement suspensions, which enables the reduction of the equipment cost, and the power consumption.

These and other objects are accomplished due to the fact that in the preparation of an asbestos cement suspensions by comminuting cement clinkers and gypsum together, the wet fluffing of asbestos and subsequent mixing thereof, according to the invention, the combined comminution of the cement clinkers and gypsum, is performed in an aqueous medium.

During the combined comminution of the cement clinker and gypsum, it is preferable to add wastes from the asbestos cement manufacture, such as broken slate, chips from machining the ends of asbestos cement pipes, as well as wet cuttings of asbestos cement sheets into the mixture.

The apparatus according to the invention comprises a cylindrical housing rotatably mounted on journals and accommodating chambers, of which two of which chambers being provided with an interchamber apertured wall partition and an outlet apertured wall partition, respectively, with the two chambers forming a drum ball mill for combined comminution of the cement clinker and gypsum in an aqueous medium adjoining one end wall of the housing connected to a feeder for supplying the starting materials, a third chamber, which is separated from the ball mill by a partition wall having a central opening, is located adjacent to the opposite end wall of the housing and constitutes means for the wet fluffing of asbestos, and a chamber located therebetween, which is intended for mixing the prepared components, is provided with at least two openings for discharging the finished suspension, and having a corresponding number of mixing blades covering these openings, and with the mixing chamber being enclosed in stationarily a mounted casing having a discharge socket pipe.

The invention substantially consists of the following:

Due to the fact that the combined comminution of the cement clinker and gypsum is performed in an aqueous medium, the entire process of preparing the asbestos cement suspension can be performed in a single apparatus located directly adjacent to the place of utilization of the suspension, that is at the asbestos cement plant where the articles are to be moulded from the suspension.

Cement clinkers and gypsum are delivered to the asbestos cement plants by any conventional transport facility. The material is fed into the comminution unit from supply hoppers providing a continuous and uniform supply. The process for the comminution of cement clinkers and gypsum according to the invention involves the addition of water to the comminuted mixture in a quantity of 35–40%. The specific amount of water to be introduced into the mixture of the cement clinker and gypsum depends on the nature of the materials used. Asbestos is fluffed in the aqueous medium in the same apparatus in which the cement clinker and gypsum are comminuted. However, the asbestos fluffing is performed separately from the treatment of the cement clinker and gypsum and takes place in a chamber separated by a partition wall.

Since asbestos uniformly supplied for fluffing into the apparatus from a supply hopper comprises a preliminarily prepared mixture of asbestos of varying grades, the amount of water to be added into the asbestos being fluffed should be such so as to maintain an asbestos cement suspension having a final moisture content of 88–90%. Water should be introduced into the mixture in such a manner so as to enable a high accuracy for batching water within predetermined percentage limits. This facilitates moulding of the asbestos cement articles. The fluffed asbestos is then mixed with the comminuted cement and gypsum in the same apparatus in a separate mixing chamber.

The invention will be better understood from the following detailed description of a specific embodiments thereof illustrated in the accompanying drawings, in which.

Figure 1:
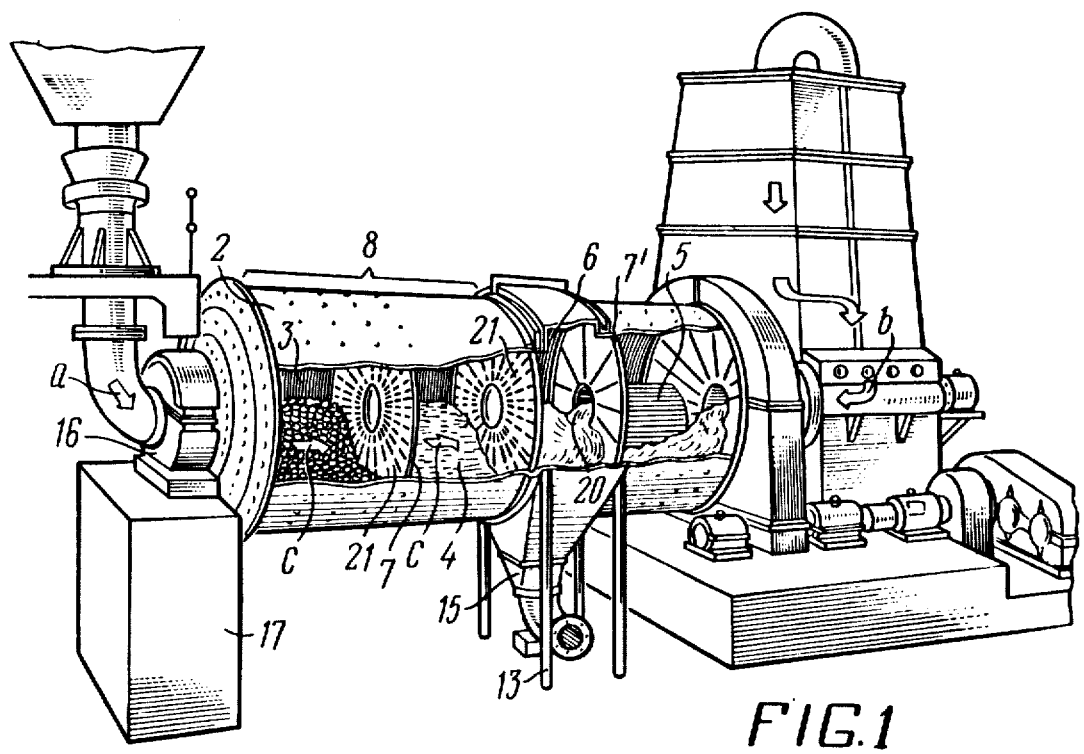
FIG. 1 shows a general view of an apparatus constructed in accordance with the invention.

As shown in the drawings, the apparatus comprises a cylindrical housing 2 (FIGS. 1, 2) rotatably mounted on journals 1 (FIG. 2), and chambers 3, 4, 5 and 6 accommodated in the housing and separated from each other by partition walls 7 and 7'.

The chambers 3 and 4 form a drum ball mill 8 for combined comminution of the cement clinker and gypsum in an aqueous medium, with said mill adjoining an end wall of the housing 2 which is connected, by means of a screw conveyor 9, to a weight batching feeder (not shown in the drawing).

The chamber 5 is located adjacent to the opposite end of the housing 2 and constitutes means for wet fluffing the asbestos which is supplied by a screw conveyor 10 located within the journal 1.

The chamber 6 located between the chambers 4 and 5 serves for mixing the fluffed asbestos and the comminuted the cement clinker and gypsum.

Figure 3:
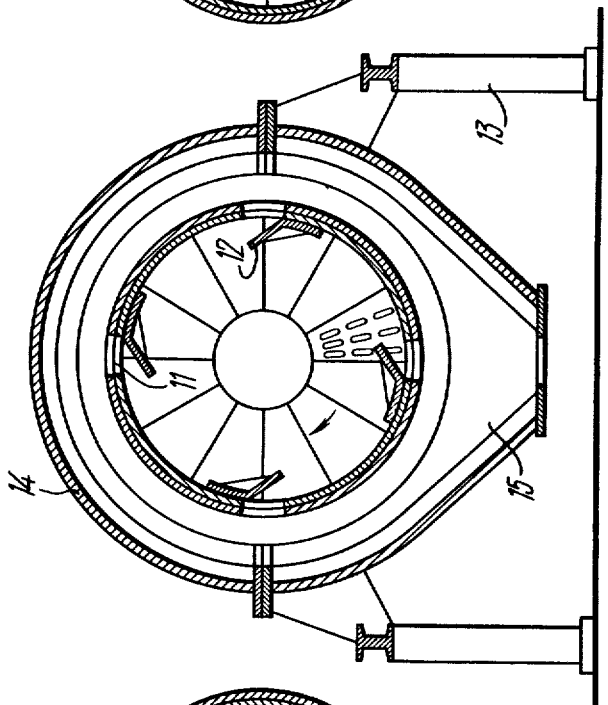
FIG. 3 is an enlarged sectional view taken along the line III—III of FIG. 2.

The chamber 6 is provided with four equally spaced openings 11 made along the periphery of the walls thereof (FIG. 3) for discharging the prepared suspension, with the openings being provided along the entire length of the mixing chamber 6.

Each opening 11 is overlapped by a mixing blade 12. The blades 12 are used for the homogenation of the fluffed asbestos with the cement slurry and for preventing direct outflow of the suspension from the apparatus.

The mixing chamber 6 is enclosed in a casing 14 having a discharge socket pipe 15, with the casing being mounted stationarily on supports 13.

The journals 1 (FIG. 2) are mounted in support bearings 16 secured to the foundation structures 17.

The inner surface of the housing 2 is provided with a liner 18 to protect it against wear. Each of the chambers 3, 4 and 5 of the apparatus is provided with a manhole closed by a cover 19 so that after removing the cover the chambers are accessible for charging milling bodies thereinto, for repairing the liner and, if necessary, for replacement and cleaning of the apertured partition walls 7.

The first chamber 3 of the apparatus is charged with milling bodies having a diameter of approximately 90, 80, 60 mm. The charge ratio is around 0.32–0.35. The second chamber 4 is charged with cylpebs. The fourth chamber 5 of the apparatus is charged with metal rods having a diameter of from 50 to 80 mm which are intended for fluffing the asbestos in an aqueous medium. The charge ratio of this chamber is around 0.32–0.35.

Figure 5:
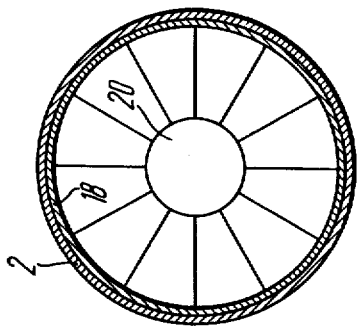
FIG. 5 is an enlarged sectional view taken along the line V—V of FIG. 2.

The interchamber partition walls 7 and 7' are of a sectional structure. The interchamber partition wall 7' consists of segments having no apertures, and which is provided with a single central opening 20 (FIG. 5). The size of the central outlet opening 20 in the interchamber partition wall 7' is such so as to ensure an unconstrained overflow of the fluffed asbestos suspension, and which size should be at least equal to the inside diameter of the journal 1.

Figure 4:
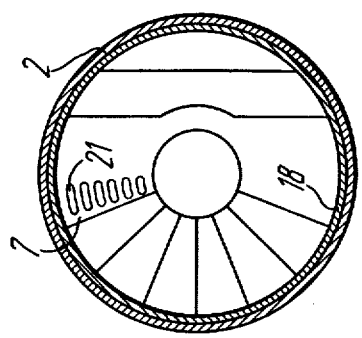
FIG. 4 is an enlarged sectional view taken along the line IV—IV of FIG. 2.

The interchamber partition walls 7 are provided with apertures 21 (FIG. 4) for the passage of the material.

Now the operation of the apparatus according to the invention will be described so to explain the process for the preparation of asbestos cement suspension according to the invention.

The starting materials consisting of water and cement clinkers, gypsum and solid wastes from asbestos cement manufacturing are continuously introduced, by means of a feeder, into the apparatus through a hollow journal 1 (FIG. 1) into the chamber 3 in the direction indicated by arrow $a$.

The composition of the starting materials, for example, may be of the following:

97–98 weight parts of cement clinker
    2–3 weight parts of gypsum per
    40–50 weight parts of water.

Figure 2:
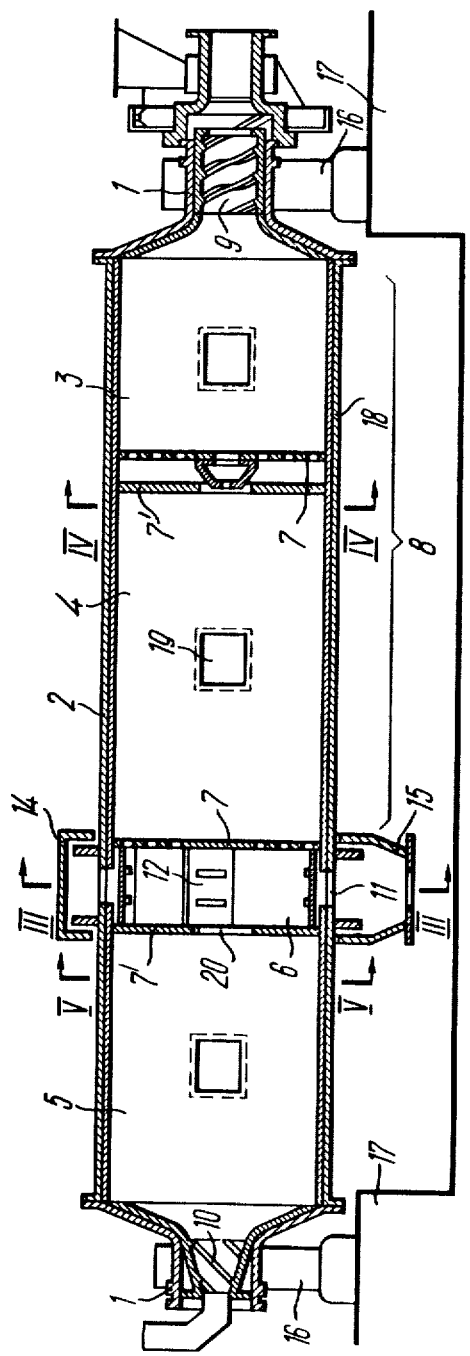
FIG. 2 shows a longitudinal section of the same apparatus.

Asbestos in an amount of 15–20 parts by weight of cement, gypsum and water is continuously supplied through the other journal 1 by the screw feeder 10 as indicated by arrow $b$ in FIG. 1 and into the chamber 5 of the apparatus. The amount of water supplied together with the asbestos is controlled in such a manner so as to obtain ready asbestos cement suspension having a moisture content of 88–90%. The wastes from asbestos cement manufacturing are added in an amount of 1–3% of the total weight of the starting materials. Under the head of the material supplied into the apparatus, and as a result of the rotation of the housing 2 about its axis, the material moves as indicated by arrow c along the axis of the apparatus. During the flow from the journal 1 towards the mixing chamber 6, cement clinkers, gipsum and solid wastes are comminuted in the chambers 3 and 4 in the aqueous medium so to obtain a cement slurry which enters the mixing chamber 6 through the apertures of the interchamber partition wall 7. The asbestos fluffed in the aqueous medium in the chamber 5 also enters the same chamber 6 through the central opening 20 of the interchamber partition wall 7'. In the mixing chamber 6, the cement slurry is homogenized with the fluffed asbestos wherein, the preparation of the asbestos cement suspension takes place. The ready suspension is discharged through the openings 11 (FIG. 2) and into the discharge socket pipe 15, wherefrom it is pumped into dispensing receptacles. In the case of an emergency necessitating the deenergization of the apparatus for a period exceeding 1.5–2 hours, the cement comminution chambers 3 and 4 may be washed with water.

What is claimed is:

1. A process for the preparation of asbestos cement suspensions comprising the steps of: comminuting cement clinkers and gypsum together in an aqueous medium, simultaneously wet fluffing asbestos, and subsequently mixing the prepared components.

2. A process according to claim 1, comprising: adding wastes from the manufacture of asbestos cement into the mixture during the combined comminution of the cement clinkers and gypsum.

3. An apparatus for the preparation of asbestos cement suspension comprising: a cylindrical housing; journals for rotatably mounting said housing; two chambers accommodated in said housing forming a drum ball mill for the combined comminution of cement clinker and gypsum said chambers adjoining one end wall of said housing; a feeder for supplying starting materials connected to said end wall of said housing; a third chamber located adjacent to the opposite end of said housing, said chamber constituting means for the wet fluffing of asbestos; a feeder for supplying asbestos connected to said opposite end of the housing; still another chamber located between said above-mentioned chambers serving for the mixing of the prepared components, said chamber having at least two openings in the walls thereof for discharging the prepared suspension; mixing blades covering said openings in the walls of said last-mentioned mixing chambers, the number of said blades corresponding to the number of said openings; a stationary mounted casing accommodating said mixing chamber and a discharge socket pipe in said casing; an interchamber apertured partition wall and an outlet apertured partition wall being provided between the chambers of the drum mill and at the outlet thereof, respectively, and a partition wall having a central outlet opening being provided between the chamber for the wet fluffing of asbestos and the mixing chambers; all said partition walls ensuring the passage of the material from one chamber into another during the preparation of asbestos cement suspension towards said discharge socket pipe.

* * * * *